US008633801B2

(12) United States Patent
Iwai

(10) Patent No.: US 8,633,801 B2
(45) Date of Patent: Jan. 21, 2014

(54) BATTERY AUTHENTICATION SYSTEM, ELECTRONIC DEVICE, BATTERY, AND BATTERY CHARGER

(75) Inventor: Toshio Iwai, Osaka (JP)

(73) Assignee: Panasonic Corporation, Osaka (JP)

( * ) Notice: Subject to any disclaimer, the term of this patent is extended or adjusted under 35 U.S.C. 154(b) by 862 days.

(21) Appl. No.: 12/419,463

(22) Filed: Apr. 7, 2009

(65) Prior Publication Data

US 2009/0256717 A1  Oct. 15, 2009

(30) Foreign Application Priority Data

Apr. 9, 2008  (JP) ................................ 2008-101199

(51) Int. Cl.
G06F 13/42  (2006.01)

(52) U.S. Cl.
USPC .......................................... 340/5.8; 320/106

(58) Field of Classification Search
USPC ............ 340/5.8, 5.31, 636.1, 636.2; 320/106; 713/300, 340
See application file for complete search history.

(56) References Cited

U.S. PATENT DOCUMENTS

| 5,717,306 | A * | 2/1998 | Shipp ............................. 307/125 |
| 2005/0001589 | A1 * | 1/2005 | Edington et al. ............... 320/128 |
| 2005/0108309 | A1 | 5/2005 | Tsuboka et al. |
| 2007/0123304 | A1 * | 5/2007 | Pattenden et al. ............. 455/557 |
| 2007/0214296 | A1 * | 9/2007 | Takamatsu et al. ............. 710/63 |

FOREIGN PATENT DOCUMENTS

| JP | 2005-151368 A | 6/2005 |
| JP | 2005-285567 | 10/2005 |
| JP | 2007-124753 | 5/2007 |
| JP | 2007-282471 | 10/2007 |

* cited by examiner

Primary Examiner — Edwin Holloway, III
(74) Attorney, Agent, or Firm — Hamre, Schumann, Mueller & Larson, P.C.

(57) ABSTRACT

A battery authentication system according to the present invention includes a battery and an electronic device. The battery includes a battery authentication portion that includes battery identification information and performs authentication between the battery and the electronic device. The electronic device includes: a power source that supplies electric power from the battery to respective portions in the electronic device; a storage portion that stores the battery identification information of usable batteries; a device authentication portion that performs authentication of the battery; and a control portion that compares the battery identification information of the battery with the battery identification information stored in the storage portion. The control portion compares the battery identification information of the battery authenticated successfully in the device authentication portion with the battery identification information stored in the storage portion, and controls the power source based on a result of the comparison. According to the battery authentication system of the present invention, it is possible to recognize whether a battery mounted is authenticated or not, and accordingly to determine whether the battery can be used or not. Therefore, it is possible to permit the use of a genuine battery and a non-genuine battery and to eliminate a counterfeit battery.

8 Claims, 10 Drawing Sheets

BATTERY AUTHENTICATION SYSTEM, ELECTRONIC DEVICE, BATTERY, AND BATTERY CHARGER

BACKGROUND OF THE INVENTION

1. Field of the Invention

The present invention relates to a battery authentication system capable of performing authentication between a portable device and a battery manufactured specifically for use in the portable device. The present invention further relates to a battery authentication system that performs authentication between a battery charger and a battery manufactured specifically for use in the battery charger. The present invention further relates to an electronic device, a battery, and a battery charger adapted to the battery authentication system.

2. Description of Related Art

Recently, many portable devices come with a battery authentication system. The battery authentication system performs authentication between a portable device and a battery manufactured specifically for use in the portable device. The battery authentication system is capable of regulating the use of a counterfeit battery in the portable device. Patent Document (JP 2005-151368 A) discloses an exemplary battery authentication system.

FIG. 10 is a block diagram showing a conventional battery authentication system. The battery authentication system performs authentication between an electronic device 100 and a genuine battery 101, a non-genuine battery 102, or a counterfeit battery 103.

The electronic device 100 includes an authentication IC 105, a control portion 106, and a power supply portion 107. The electronic device 100 is not limited particularly, as long as it can be operated by electric power supplied by a battery. The electronic device 100 is preferably a portable device such as a video camera, a digital camera, and a mobile phone terminal.

The authentication IC 105 executes authentication processing between the electronic device and the battery. Specifically, the authentication IC 105 requires the battery mounted on the electronic device 100 to provide its authentication information, compares the authentication information sent from the battery with authentication information stored in the authentication IC 105, and outputs a comparison result (authentication result) to the control portion 106.

The power supply portion 107 supplies electric power from the battery to respective portions in the electronic device 100.

The control portion 106 controls the operation of the power supply portion 107 based on the authentication result sent from the authentication IC 105. Specifically, when the battery is authenticated successfully in the authentication IC 105, the control portion 106 permits the operation of the power supply portion 107. On the other hand, when the battery is not authenticated in the authentication IC 105, the control portion 106 does not permit the operation of the power supply portion 107.

The genuine battery 101 is a battery manufactured by a manufacturer of the electronic device 100 (hereinafter, referred to as a device manufacturer), or a battery manufactured by a manufacturer (hereinafter, referred to as a genuine battery manufacturer) authorized by the device manufacturer to manufacture the battery. The genuine battery 101 is labeled with the same brand name as that given on the electronic device 100. The genuine battery 101 includes an authentication IC 104. The authentication IC 104 is an information device storing information for performing authentication between the authentication IC 104 and the paired authentication IC 105.

The non-genuine battery 102 is a battery authorized by the device manufacturer to be used in the electronic device 100. The non-genuine battery 102 is manufactured by a manufacturer (hereinafter, referred to as a non-genuine battery manufacturer) different from the device manufacturer and the genuine battery manufacturer, and is in circulation with an original brand name of the non-genuine battery manufacturer. The non-genuine battery 102 has substantially the same appearance, function, and performance as those of the genuine battery 101. The non-genuine battery 102 does not include an authentication IC as mounted on the genuine battery 101. The non-genuine battery 102 plays an effective role in ensuring the supply of batteries in areas that cannot be covered by the genuine battery 101 alone, and marketing a product with a battery capacity that is not commercially available for the genuine battery 101. The supply of the non-genuine battery 102 also helps promote the sales of electronic devices.

The counterfeit battery 103 is a battery manufactured by a manufacturer that is not authorized by the device manufacturer. Although the counterfeit battery 103 is similar in appearance to the genuine battery 101, it does not necessarily ensure sufficient performance and function because its internal structure is simplified for a price reduction. The counterfeit battery 103 includes no authentication IC.

Hereinafter, the operation of the conventional battery authentication system will be described.

When a battery is mounted in a predetermined battery mounting portion (not shown), and a power supply switch (not shown) is turned from off to on, the electronic device 100 starts authentication processing. Specifically, the authentication IC 105 requires the battery mounted in the battery mounting portion to provide its authentication information, and executes authentication processing based on the authentication information sent from the battery.

When the genuine battery 101 is mounted on the electronic device 100, the authentication IC 105 obtains the authentication information from the authentication IC 104 of the genuine battery 101, and compares it with authentication information stored in the authentication IC 105. The authentication IC 105 sends a result of the comparison to the control portion 106 as an authentication result. When the battery is authenticated successfully according to the authentication result, the control portion 106 activates the power supply portion 107. The power supply portion 107 supplies electric power to the respective portions in the electronic device 100, thereby activating the electronic device 100.

When the counterfeit battery 103 is mounted on the electronic device 100, the authentication IC 105 executes authentication processing. Since the counterfeit battery 103 includes no authentication IC, the counterfeit battery 103 is not authenticated. The control portion 106 regulates the activation of the power supply portion 107 based on an authentication result (unsuccessful authentication) sent from the authentication IC 105. Since the power supply portion 107 cannot supply electric power to the respective portions in the electronic device 100, the electronic device 100 cannot be operated.

When the non-genuine battery 102 is mounted on the electronic device 100, the authentication IC 105 executes authentication processing. Since the non-genuine battery 102 includes no authentication IC, the non-genuine battery 102 is not authenticated. The control portion 106 regulates the activation of the power supply portion 107 based on an authentication result (unsuccessful authentication) sent from the authentication IC 105. Since the power supply portion 107 cannot supply electric power to the respective portions in the electronic device 100, the electronic device 100 cannot be operated.

As described above, according to the conventional battery authentication system, it is impossible to perform authentication between the electronic device 100 and the non-genuine battery 102, so that the non-genuine battery 102 cannot be used in the electronic device 100.

The non-genuine battery 102 has the advantages of ensuring the supply of batteries in areas that cannot be covered by the genuine battery 101 alone, and marketing a product with a battery capacity that is not commercially available for the genuine battery 101. Further, the supply of the non-genuine battery 102 is also advantageous in helping promote the sales of electronic devices. However, the conventional battery authentication system cannot bring about the above-described advantages.

SUMMARY OF THE INVENTION

It is an object of the present invention to provide a battery authentication system that can permit the use of a genuine battery and a non-genuine battery and eliminate a counterfeit battery.

A battery authentication system according to a first configuration of the present invention includes: an electronic device; and a battery that is attachable to and detachable from the electronic device. The battery includes a battery authentication portion that includes battery identification information and performs authentication between the battery and the electronic device. The electronic device includes: a power source that supplies electric power from the battery to respective portions in the electronic device; a storage portion that stores the battery identification information of usable batteries; a device authentication portion that performs authentication of the battery; and a control portion. The control portion compares the battery identification information of the battery authenticated successfully in the device authentication portion with the battery identification information stored in the storage portion, and controls the power source based on a result of the comparison.

A battery authentication system according to a second configuration of the present invention includes: a battery charger; and a battery that is attachable to and detachable from the battery charger. The battery includes a battery authentication portion that includes battery identification information and performs authentication between the battery and the battery charger. The battery charger includes: a storage portion that stores the battery identification information of usable batteries; a battery charger authentication portion that performs authentication of the battery; and a control portion. The control portion compares the battery identification information of the battery authenticated successfully in the battery charger authentication portion with the battery identification information stored in the storage portion, and controls a charging operation based on a result of the comparison. An electronic device according to the present invention can be operated by electric power supplied by a battery including battery identification information. The device includes: a power source that supplies the electric power from the battery to respective portions in the electronic device; a storage portion that stores the battery identification information of usable batteries; a device authentication portion that performs authentication of the battery; and a control portion. The control portion compares the battery identification information of the battery authenticated successfully in the device authentication portion with the battery identification information stored in the storage portion, and controls the power source based on a result of the comparison.

A battery charger according to the present invention can charge a battery including battery identification information. The charger includes: a storage portion that stores the battery identification information of usable batteries; a battery charger authentication portion that performs authentication of the battery; and a control portion. The control portion compares the battery identification information of the battery authenticated successfully in the battery charger authentication portion with the battery identification information stored in the storage portion, and controls a charging operation based on a result of the comparison.

A battery according to the present invention includes a battery authentication portion that includes battery identification information and performs authentication between the battery and an electronic device or a battery charger. The battery authentication portion stores the battery identification information that is different depending on a type of the battery.

According to the battery authentication system of the present invention, it is possible to recognize whether a battery attachable to an electronic device is authenticated or not, and accordingly to determine whether the battery can be used or not. Therefore, it is possible to permit the use of a genuine battery and a non-genuine battery and to eliminate a counterfeit battery.

DETAILED DESCRIPTION OF THE INVENTION

The battery authentication system according to the present invention further can include a display portion that can display remaining amount information of the battery. The control portion can change a display mode of the remaining amount information to be displayed in the display portion according to the battery identification information. With this configuration, it is possible to provide a functional difference and a performance difference between a non-genuine battery and a genuine battery.

In the battery authentication system according to the present invention, the battery identification information stored in the storage portion can be modifiable. With this configuration, a non-genuine battery or a genuine battery having battery identification information different from conventional one can be made usable by modifying the battery identification information stored in the storage portion. Further, it is possible to prohibit the use of a non-genuine battery or a genuine battery having specific battery identification information.

In the battery authentication system according to the present invention, the battery identification information stored in the battery authentication portion only can be read out from the battery authentication portion. With this configuration, the battery identification information (ID mark) refers to information written previously in the authentication IC by a manufacturer of the authentication IC so as to be read only, which then is incorporated into a battery and shipped. In other words, the information written in the authentication IC is unknown to and unmodifiable by a battery manufacturer. If the information written in the authentication IC is modifiable, the information may be modified to improper information. However, when the information written in the authentication IC is unmodifiable as in the present invention, the information can be prevented from being modified to improper information.

Embodiment 1

[1. Configuration of Battery Authentication System]

Figure 1:
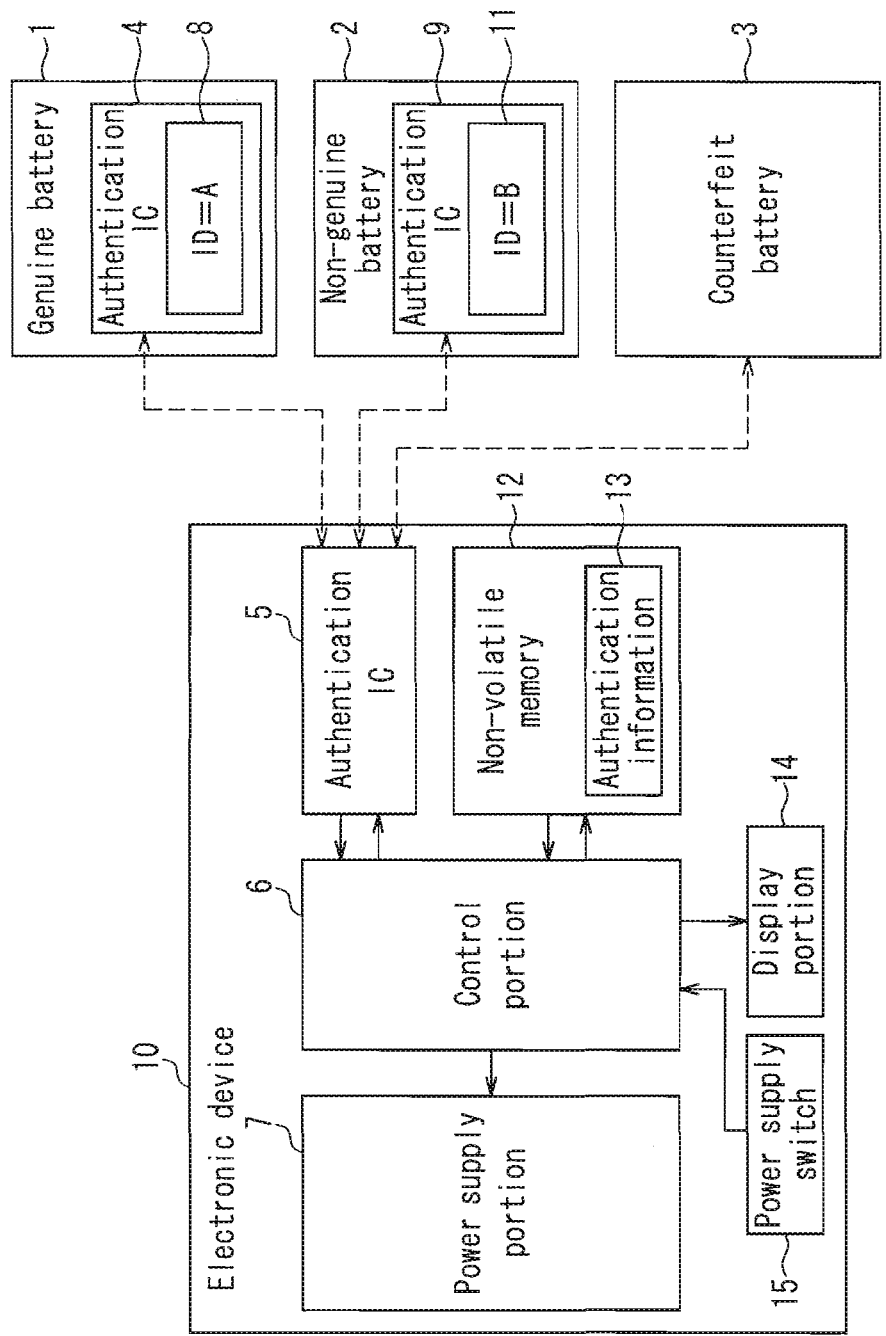
FIG. 1 is a block diagram showing a battery authentication system according to Embodiment 1.

FIG. 1 is a block diagram showing a battery authentication system according to Embodiment 1. The battery authentication system performs authentication between an electronic device 10 and a genuine battery 1, a non-genuine battery 2, or a counterfeit battery 3.

The electronic device 10 includes an authentication IC 5, a control portion 6, a power supply portion 7, a non-volatile memory 12, a display portion 14, and a power supply switch 15. The electronic device 10 can be operated by electric power supplied by a battery. The electronic device 10 is preferably a portable device, such as a video camera, a digital camera, and a mobile phone terminal, that is operated by power supplied by a battery.

The authentication IC 5 executes authentication processing between the electronic device and the battery. Specifically, the authentication IC 5 requires the battery mounted on the electronic device 10 to provide its authentication information, compares the authentication information sent from the battery with authentication information stored in the authentication IC 5, and outputs a comparison result (authentication result) to the control portion 6. Although in Embodiment 1, the authentication IC 5 is realized by an IC (integrated circuit), the present invention is not limited thereto, as long as it can store at least the authentication information.

The power supply portion 7 supplies electric power to respective portions in the electronic device 10. Although not shown specifically, the power supply portion 7 is supplied with electric power by a battery authenticated successfully in the electronic device 10, and supplies electric power to the respective portions in the electronic device 10. However, in order for the electronic device 10 to perform authentication processing, the power supply portion 7 is supplied with electric power by an unauthenticated battery so as to operate the electronic device 10.

The control portion 6 controls the operation of the power supply portion 7 based on the authentication result sent from the authentication IC 5. Specifically, when the battery is authenticated successfully in the authentication IC 5, the control portion 6 permits the operation of the power supply portion 7. On the other hand, when the battery is not authenticated in the authentication IC 5, the control portion 6 does not permit the operation of the power supply portion 7. In Embodiment 1, the control portion 6 is realized by a microcomputer, for example.

The non-volatile memory 12 stores authentication information 13 including a plurality of ID marks of batteries that can be used in the electronic device 10. The non-volatile memory 12 preferably is realized by an EEPROM (electrically erasable programmable read-only memory), a flash memory, or the like.

The display portion 14 can display visible information. For example, in the case where the electronic device 10 is a video camera, the display portion 14 can be realized by a liquid crystal display capable of displaying a captured image or the like. In Embodiment 1, the display portion 14 can display a battery remaining amount. A specific display mode of the battery remaining amount will be described later.

The power supply switch 15 allows a user to turn on/off a power source of the electronic device 10.

The genuine battery 1 is a battery manufactured by a manufacturer of the electronic device 10 (hereinafter, referred to as a device manufacturer), or a battery manufactured by a manufacturer (hereinafter, referred to as a genuine battery manufacturer) authorized by the device manufacturer to manufacture the battery. The genuine battery 1 is labeled with the same brand name as that given on the electronic device 10. The genuine battery 1 includes an authentication IC 4.

The authentication IC 4 stores authentication information specific to the genuine battery 1. The authentication IC 4 stores the authentication information for performing authentication between the authentication IC 4 and the paired authentication IC 5. The authentication IC 4 preferably is manufactured by the same manufacturer as that of the authentication IC 5 of the electronic device 10. This allows all the information regarding authentication to be integrated in the manufacturer of the authentication IC 5, making it possible to reduce the risk of information leaking to the outside.

The genuine battery manufacturer is supplied with the authentication IC 4 from the manufacturer of the authentication IC 4 (in Embodiment 1, the manufacturer of the authentication IC 5), and incorporates it into the genuine battery 1. Since the genuine battery manufacturer need not manage the authentication information stored in the authentication IC 4 when incorporating the authentication IC 4 into the genuine battery 1, the genuine battery 1 can be managed easily. Here, the "management of the authentication information" refers to management to keep a mechanism of cryptographic authentication in secrecy, management to keep a cryptographic key in secrecy, and the like. Although in Embodiment 1, the authentication IC 4 is realized by an IC (integrated circuit), the present invention is not limited thereto, as long as it can store at least the authentication information.

The non-genuine battery 2 is a battery authorized by the device manufacturer to be used in the electronic device 10. The non-genuine battery 2 is manufactured by a manufacturer (hereinafter, referred to as a non-genuine battery manufacturer) different from the device manufacturer and the genuine battery manufacturer, and is labeled with an original brand name of the non-genuine battery manufacturer. The non-genuine battery 2 needs to be the same as the genuine battery 1 in a portion to be connected to a main body of the device. However, the non-genuine battery 2 is not necessarily required to have the same appearance, function, and performance as those of the genuine battery 1. The non-genuine battery 2 plays an effective role in ensuring the supply of batteries in areas that cannot be covered by the genuine battery 1 alone, and marketing a product with a battery capacity that is not commercially available for the genuine battery 1. The supply of the non-genuine battery 2 also helps promote the sales of electronic devices. The non-genuine battery 2 includes an authentication IC 9.

The authentication IC 9 stores authentication information specific to the non-genuine battery 2. The authentication IC 9 is different from the authentication IC 4. The authentication information stored in the authentication IC 9 is different from the authentication information stored in the authentication IC 4 in the genuine battery 1. The authentication IC 9 preferably is manufactured by the same manufacturer as that of the authentication IC 5 of the electronic device 10. This allows all the information regarding authentication to be integrated in the manufacturer of the authentication IC 5, making it possible to prevent information leaking to the outside.

The non-genuine battery manufacturer is supplied with the authentication IC 9 from the manufacturer of the authentication IC 9 (in Embodiment 1, the manufacturer of the authentication IC 5), and incorporates it into the non-genuine battery 2. Since the non-genuine battery manufacturer need not manage the authentication information stored in the authentication IC 9 when incorporating the authentication IC 9 into the non-genuine battery 2, the non-genuine battery 2 can be managed easily. Although in Embodiment 1, the authentication IC 9 is realized by an IC (integrated circuit), the present invention is not limited thereto, as long as it can store at least the authentication information.

The counterfeit battery 3 is a battery manufactured by a manufacturer that is not authorized by the device manufacturer. Although the counterfeit battery 3 is similar in appearance to the genuine battery 1, it does not necessarily ensure sufficient performance and function because its inner components are simplified for a reduction in costs and sales price. The counterfeit battery 3 includes no authentication IC.

The authentication IC 4 in the genuine battery 1 includes a read-only register 8. The read-only register 8 holds an ID mark (e.g., "ID=A") that identifies the genuine battery 1. After performing cryptographic authentication between the electronic device 10 and the genuine battery 1, the control portion 6 issues to the read-only register 8 a command for reading out the ID mark and a register address of the ID mark stored in the read-only register 8. In this manner, the ID mark held in the read-only register 8 can be read out.

The authentication IC 9 in the non-genuine battery 2 includes a read-only register 11. The read-only register 11 holds an ID mark (e.g., "ID=B") that identifies the non-genuine battery 2. After performing cryptographic authentication between the electronic device 10 and the non-genuine battery 2, the control portion 6 issues to the read-only register 11 a command for reading out the ID mark and a register address of the ID mark stored in the read-only register 11. In this manner, the ID mark held in the read-only register 11 can be read out.

The ID marks held in the read-only registers 8 and 11 are written previously in the authentication ICs 4 and 9 by the manufacturer of the authentication IC 5. The ID marks held in the read-only registers 8 and 11 only can be read out from the authentication ICs 4 and 9. In other words, no deletion, addition, nor rewriting of the ID marks held in the read-only registers 8 and 11 can be performed by a party other than the manufacturer of the authentication ICs 4 and 9. Thus, it is possible to prevent the authentication IDs from being modified improperly. For example, in the case where a function restriction is imposed on the electronic device 10 depending on the ID mark of the battery, when an ID mark is modified without permission from the device manufacturer, the function restriction may be removed improperly. To avoid this problem, the ID marks are prevented from being modified by a party other than the device manufacturer as in Embodiment 1. Further, an authentication ID of a battery that is not authorized to be used in the electronic device 10 may be modified to an authentication ID of a battery that is authorized to be used, without permission from the device manufacturer or the battery manufacturer. To avoid this problem, the ID marks are prevented from being modified by a party other than the device manufacturer or the battery manufacturer as in Embodiment 1.

The device manufacturer verifies an operation of the non-genuine battery 2, and supplies the non-genuine battery manufacturer with the authentication IC 9 when the operation of the non-genuine battery 2 satisfies a predetermined condition. At this time, the device manufacturer writes authentication information (such as the ID mark) giving permission for use in the electronic device 10 in the authentication IC 9, and then supplies the authentication IC 9 to the non-genuine battery manufacturer. The non-genuine battery manufacturer incorporates the obtained authentication IC 9 into the non-genuine battery 2. On the other hand, when the operation of the non-genuine battery 2 does not satisfy the predetermined condition, the device manufacturer does not supply the non-genuine battery manufacturer with the authentication IC. Here, the "predetermined condition" refers to a rated value of the battery, charging/discharging characteristics, and the like.

[2. Battery Authentication Processing]

Figure 2:
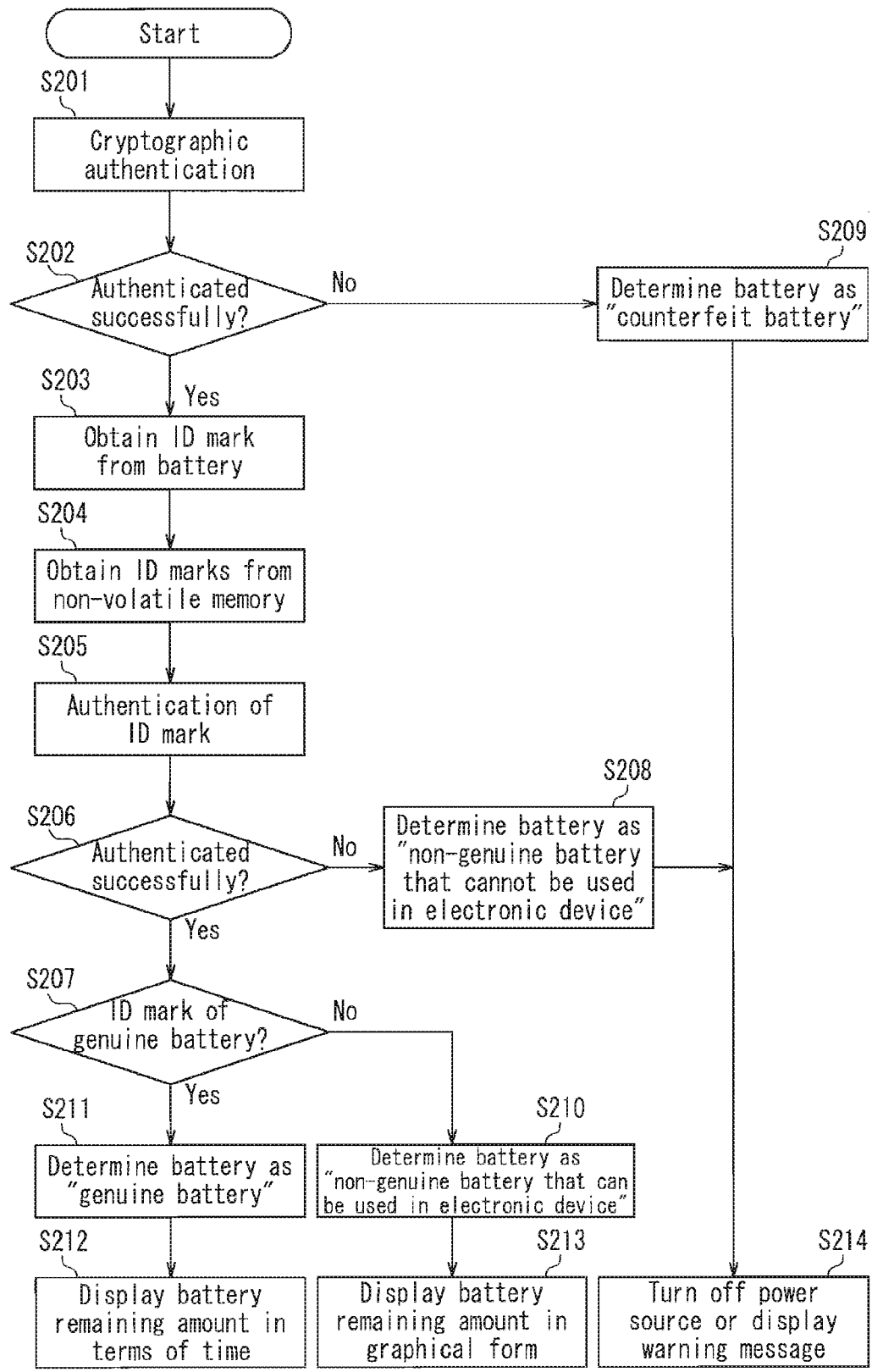
FIG. 2 is a flowchart illustrating battery determination processing according to Embodiment 1.

FIG. 2 is a flowchart illustrating authentication processing in the battery authentication system according to Embodiment 1.

Initially, when a battery is mounted in a predetermined battery mounting portion (not shown) in the electronic device 10, and the power supply switch 15 is turned from off to on, authentication processing is started. Specifically, the authentication IC 5 requires the battery to provide its cryptographic information. The authentication IC 5 analyzes the cryptographic information sent from the battery, and compares it with cryptographic information stored in the authentication IC 5. The authentication IC 5 sends a result of the comparison to the control portion 6 (S201).

The authentication processing is executed during a period until the electronic device 10 shifts to a normal operation state (e.g., in the case where the electronic device 10 is a video camera, this corresponds to a photographing state). Further, the electronic device 10 executes the authentication processing by electric power supplied by the battery mounted in the battery mounting portion. In other words, the electronic device 10 is operated by electric power supplied by the unauthorized battery while performing the authentication processing. In Embodiment 1, the authentication processing is started when the power supply switch 15 is turned from off to on. However, the authentication processing may be executed when the battery is mounted in the battery mounting portion in the electronic device 10.

When the battery is not authenticated as a result of the cryptographic authentication in the authentication IC 5 (No in S202), the control portion 6 determines that the battery mounted in the battery mounting portion is the counterfeit battery 3. More specifically, since the counterfeit battery 3 includes no authentication IC, the authentication IC 5 cannot obtain authentication information from the counterfeit battery 3, resulting in a failure of the cryptographic authentication (S209).

When determining that the battery mounted in the battery mounting portion is the counterfeit battery 3, the control portion 6 instructs the power supply portion 7 to turn off the power source of the electronic device 10. The power supply portion 7 stops supplying electric power to the respective portions in the electronic device 10 based on the control of the control portion 6. In Embodiment 1, when the counterfeit battery 3 is mounted in the battery mounting portion, the power source of the electronic device 10 is turned off. However, a warning message may be displayed in the display portion 14. The warning massage to be displayed in the display portion 14 can include a message that prompts the user to remove the battery from the battery mounting portion (S214).

On the other hand, when the battery is authenticated successfully as a result of the cryptographic authentication in the authentication IC 5 (Yes in S202), the control portion 6 reads out the ID mark stored in the authentication IC in the battery (S203).

Then, the control portion 6 reads out the ID marks stored in the non-volatile memory 12 (S204).

Thereafter, the control portion 6 compares the ID mark obtained from the authentication IC in the battery with the ID marks obtained from the non-volatile memory 12, thereby performing authentication (S205).

When the ID mark obtained from the authentication IC in the battery coincides with one of the ID marks obtained from the non-volatile memory 12 (Yes in S206), the control portion 6 determines that the "battery mounted in the battery mounting portion can be used in the electronic device 10".

On the other hand, when the ID mark obtained from the authentication IC in the battery does not coincide with any of the ID marks obtained from the non-volatile memory 12 (No in S206), the control portion 6 determines that the "battery mounted in the battery mounting portion is a non-genuine battery that cannot be used in the electronic device 10" (S208).

The non-volatile memory 12 may store only the ID marks of batteries authorized to be used in the electronic device 10, or also may store ID marks of batteries that are not authorized to be used in the electronic device 10 in addition to the ID marks of batteries authorized to be used. In the case where the non-volatile memory 12 stores the ID marks of batteries authorized to be used in the electronic device 10 and the ID marks of batteries that are not authorized to be used, when the authentication ID of the battery coincides with one of the ID marks of batteries authorized to be used in the electronic device 10 in the authentication processing, the battery is authenticated successfully (Yes in S206). On the other hand, when the authentication ID of the battery coincides with one of the ID marks of batteries that are not authorized to be used in the electronic device 10, the battery is not authenticated (No in S206).

Then, the control portion 6 compares the ID mark obtained from the authentication IC in the battery with the ID marks obtained from the non-volatile memory 12, and determines whether the ID mark obtained from the authentication IC in the battery is the ID mark of the genuine battery or the ID mark of the non-genuine battery (S207). In a list of the ID marks stored in the non-volatile memory 12, the ID marks of the genuine batteries and the ID marks of the non-genuine batteries are specified.

When determining that the ID mark obtained from the authentication IC in the battery coincides with one of the ID marks of the genuine batteries stored in the non-volatile memory 12 (Yes in S207), the control portion 6 determines that the "battery mounted in the battery mounting portion is the genuine battery 1" (S211).

When determining that the battery mounted in the battery mounting portion is the genuine battery 1, the control portion 6 calculates a remaining lifetime based on a remaining amount of the genuine battery 1. The control portion 6 displays the calculated lifetime in the display portion 14 (S212).

Figure 3A:
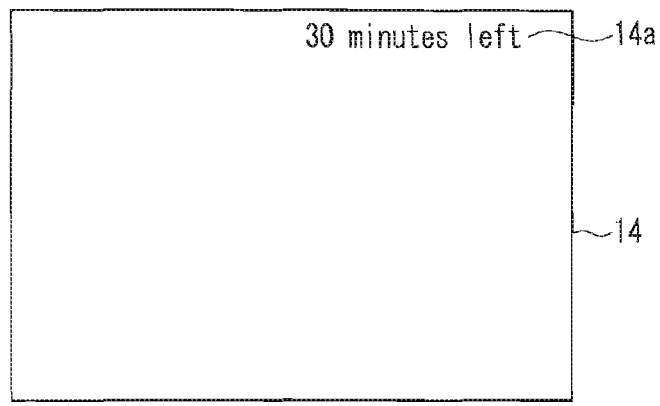
FIG. 3A is a schematic view showing a display of a battery remaining amount.

FIG. 3A shows a state in which the lifetime is displayed in the display portion 14 in the form of character information 14*a*. As shown in FIG. 3A, the lifetime can be displayed in minutes in Embodiment 1. In the case of displaying the battery remaining amount in terms of the lifetime, a current during the charging and discharging of the battery is integrated, and the lifetime is calculated based on the current integrated capacity value.

Figure 3B:
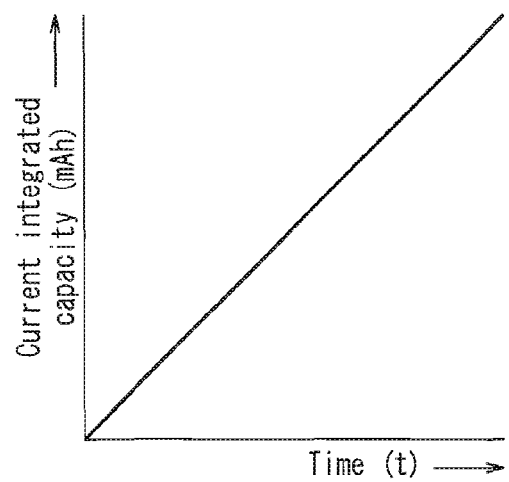
FIG. 3B is a characteristics diagram showing a change in a current integrated capacity with the passage of time during charging.
Figure 3C:
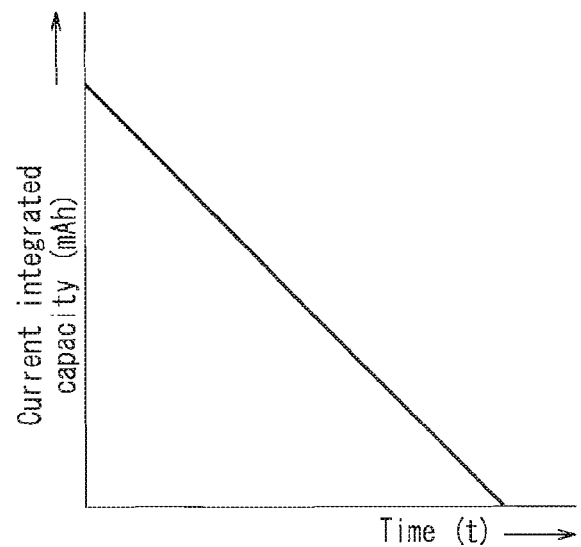
FIG. 3C is a characteristics diagram showing a change in a current integrated capacity with the passage of time during discharging.

FIG. 3B shows a change in a current integrated capacity value with the passage of time during the charging of the battery. FIG. 3C shows a change in a current integrated capacity value with the passage of time during the discharging of the battery. In FIGS. 3B and 3C, the vertical axis represents the current integrated capacity value, and the horizontal axis represents the passage of time. When the battery is charged with a constant current, the current integrated capacity value increases in direct proportion to the passage of time as shown in FIG. 3B. When the battery is fully charged, the charging operation is stopped under the control of a battery charger or the like. On the other hand, when the battery is discharged with a constant current, the current integrated capacity value decreases in inverse proportion to the passage of time as shown in FIG. 3C. In general, in the method of using the current integrated capacity, the capacity is obtained through a constant monitoring of a current flowing into the battery per unit time or a current flowing out of the battery per unit time. More specifically, during charging, a current (mA) flowing into a cell of the battery per unit time is added sequentially to the current integrated capacity (mAh) per unit time, and an increase in the current integrated capacity is managed. During discharging, on the other hand, a current (mA) flowing out of the cell of the battery per unit time is subtracted sequentially from the current integrated capacity (mAh) per unit time, and a decrease in the current integrated capacity is managed. The characteristics shown in FIGS. 3B and 3C are an example. During the discharging of the genuine battery 1, the control portion 6 measures an output current I (mA) and a current integrated capacity Ih (mAh) of the genuine battery 1 per unit time, thereby calculating a lifetime T. The following is a formula for calculating the lifetime T.

$$T=Ih/I$$

Returning to FIG. 2, when determining that the ID mark obtained from the authentication IC in the battery coincides with one of the ID marks of the non-genuine batteries stored in the non-volatile memory 12 (No in S207), the control portion 6 determines that the "battery mounted in the battery mounting portion is the non-genuine battery that can be used in the electronic device 10" (S210).

When determining that the battery mounted in the battery mounting portion is the non-genuine battery 2 that can be used in the electronic device 10, the control portion 6 displays battery remaining amount information in the display portion 14 in graphical form based on a remaining amount of the non-genuine battery 2 (S213).

Figure 4A:
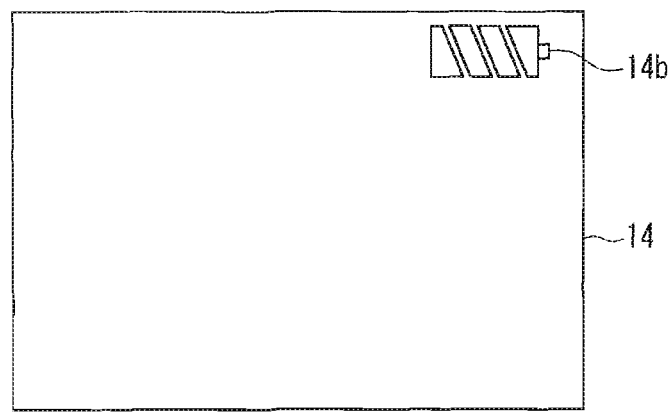
FIG. 4A is a schematic view showing a display of a battery remaining amount.
Figure 4B:
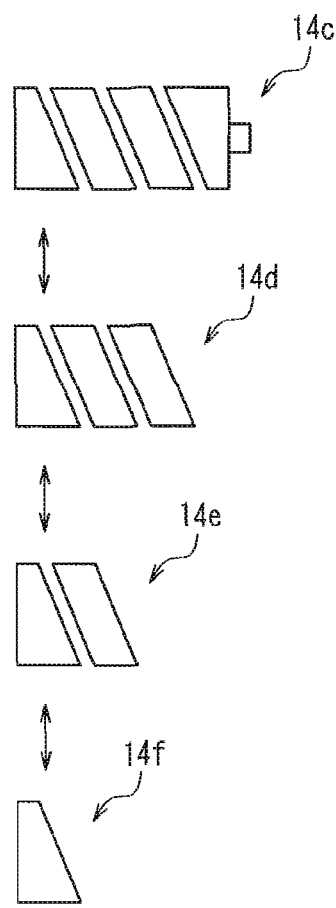
FIG. 4B is a schematic view showing a change in a display of a battery remaining amount.

FIG. 4A shows a state in which the remaining amount of the non-genuine battery 2 is displayed in the display portion 14 in graphical form. FIG. 4B shows a transition of the display of the remaining amount in accordance with a change in the remaining amount of the non-genuine battery 2. As shown in FIG. 4B, a remaining amount image 14b includes four image regions. In Embodiment 1, when a terminal voltage of the non-genuine battery 2 measures 8.0 V or more, the control portion 6 displays a remaining amount image 14c shown in FIG. 4B in the display portion 14. When the terminal voltage of the non-genuine battery 2 is in a range of 7.5 to 8.0 V, the control portion 6 displays a remaining amount image 14d shown in FIG. 4B in the display portion 14. When the terminal voltage of the non-genuine battery 2 is in a range of 7.0 to 7.5 V, the control portion 6 displays a remaining amount image 14e shown in FIG. 4B in the display portion 14. When the terminal voltage of the non-genuine battery 2 is in a range of 6.5 to 7.0 V, the control portion 6 displays a remaining amount image 14f shown in FIG. 4B. When the terminal voltage of the non-genuine battery 2 is less than 6.5 V, the control portion 6 displays a warning message informing that the battery remaining amount is running out in the display portion 14. Alternatively, when the terminal voltage of the non-genuine battery 2 is less than 6.5 V, the control portion 6 can turn off the power source of the electronic device 10. The terminal voltage of the non-genuine battery 2 used to control the display of the remaining amount is an example.

[3. Effect etc. of Embodiment 1]

According to the battery authentication system of Embodiment 1, the non-genuine battery 2 includes the authentication IC 9 storing the ID mark given specifically to the non-genuine battery that can be used in the electronic device 10, and the electronic device 10 includes the non-volatile memory 12 storing the ID marks of batteries that can be used in the electronic device 10. Therefore, by the authentication processing in the electronic device 10, it is possible to permit the use of the genuine battery 1 and the non-genuine battery 2 and to regulate the use of the counterfeit battery 3.

In Embodiment 1, the ID information of usable batteries is stored in the non-volatile memory 12. However, it is also possible to put the information into a partial region in a program memory (more specifically, a non-volatile memory such as a flash memory and a mask ROM) built in the control portion 6. In such a case, the non-volatile memory becomes unnecessary, which leads to a reduction in costs.

Further, in Embodiment 1, the authentication information 13 stored in the non-volatile memory 12 is rewritable, so that a specific battery can be made unusable in the electronic device 10. For example, in the case where a performance problem arises in the non-genuine battery 2 that originally has been authorized to be used in the electronic device 10, the authentication information of the non-genuine battery 2 among the authentication information 13 stored in the non-volatile memory 12 is modified to "unusable". In this manner, it is possible to prevent the use of a non-genuine battery or the like in which a performance problem has arisen in the electronic device 10, which contributes to the avoidance of a problem that will be caused when such a non-genuine battery is used. The authentication information 13 is preferably unmodifiable by a party other than the device manufacturer or the manufacturer of the authentication IC 9, so as to prevent rewriting of the authentication information 13 into improper information.

Further, in Embodiment 1, the electronic device 10 and the genuine battery 1 or the non-genuine battery 2 respectively have terminals. When the battery is mounted in the battery mounting portion in the electronic device, the terminals are connected electrically with each other, so that the authentication IC 5 and the authentication IC 4 or the authentication IC 9 transmit and receive the information to/from each other by wire. However, the transmission/reception of the information may be performed using radio waves.

Figure 5:
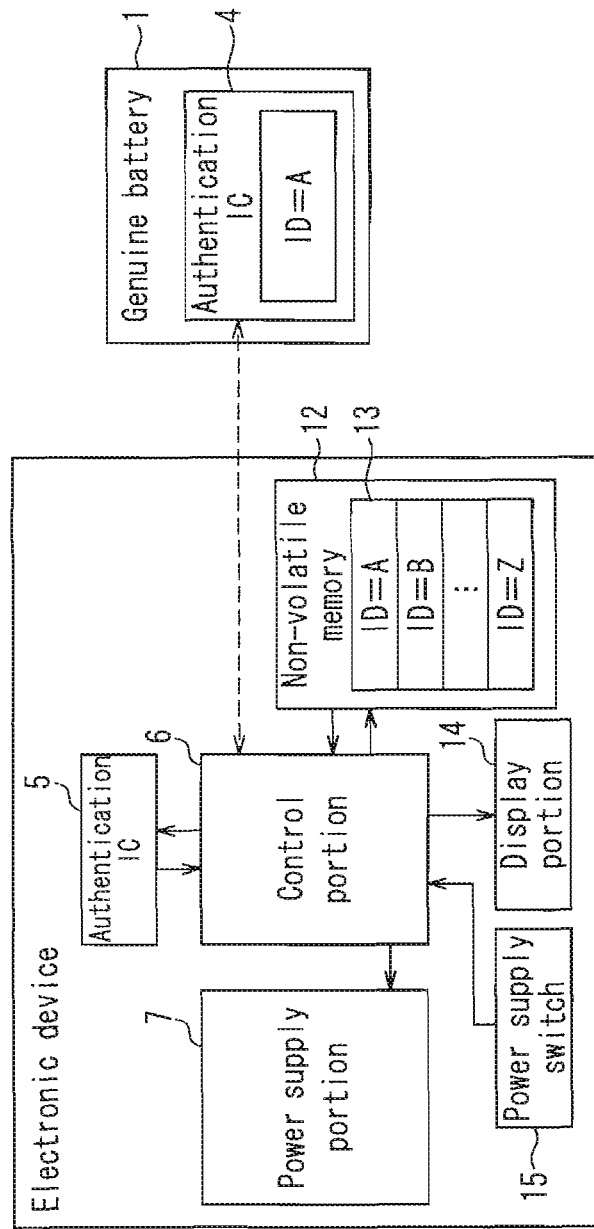
FIG. 5 is a block diagram showing an example of the battery authentication system according to Embodiment 1.

Further, a system as shown in FIG. 5 is also available, in which the control portion 6 receives the authentication information sent from the battery (e.g., the genuine battery 1) and transfers it to the authentication IC 5. The electronic authentication system shown in FIG. 5 has the advantage that the communication specification for the authentication IC 5 can be simplified because the control portion 6 can receive the authentication information from the battery. During cryptographic authentication, the control portion 6 sends the information output from the authentication IC 5 of the electronic device 10 to the authentication IC 4 in the battery, and sends the information output from the authentication IC 4 in the battery to the authentication IC 5 of the electronic device 10. When the cryptographic authentication processing between the electronic device and the battery is completed, the control portion 6 directly obtains the ID mark in the authentication IC 4 on the battery side, and compares it with a list of the ID information 13 of usable batteries stored in the non-volatile memory 12.

Further, in Embodiment 1, it is determined whether the battery mounted is the genuine battery 1 or the non-genuine battery 2, and the display mode of the battery remaining amount information is made different according to the battery, so that the remaining amount can be displayed suitably for the respective batteries. As shown in FIG. 3A, in order to display the lifetime in minutes, it is necessary to grasp the charging/discharging characteristics of the battery precisely. Although the device manufacturer verifies the operation of the non-genuine battery 2 and confirms that the operation of the non-genuine battery 2 satisfies the predetermined condition, it is impossible to grasp the charging/discharging characteristics of all the non-genuine batteries 2 precisely. Accordingly, in the case of using the non-genuine battery 2 in the electronic device 10, if the lifetime is displayed in minutes as shown in FIG. 3A, a problem could arise in that the displayed lifetime disagrees with an actual lifetime. In view of this, when the genuine battery 1 whose battery characteristics can be grasped precisely is mounted on the electronic device 10, the lifetime is displayed in minutes. On the other hand, when the non-genuine battery 2 is mounted, the remaining amount information is displayed in several stages as a guide as shown in FIGS. 4A and 4B. In this manner, the remaining amount is displayed suitably according to the battery.

Embodiment 2

[1. Configuration of Battery Authentication System]

Figure 6:
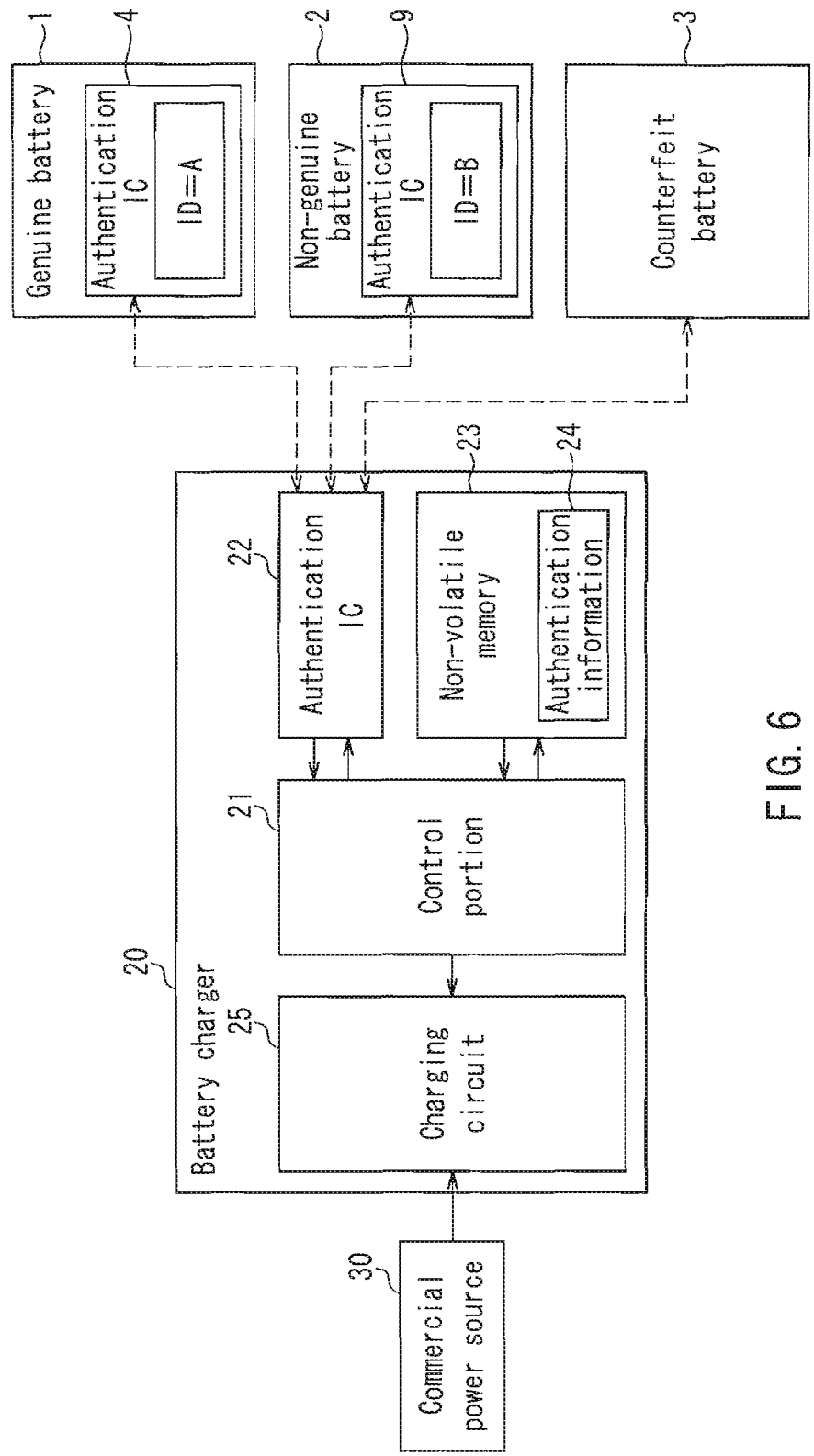
FIG. 6 is a block diagram showing a battery authentication system according to Embodiment 2.

FIG. 6 is a block diagram showing a battery charger and batteries adapted to a battery authentication system according to Embodiment 2. In FIG. 6, a genuine battery 1, a non-genuine battery 2, and a counterfeit battery 3 have the same configurations as those shown in FIG. 1, and thus the detailed description will not be repeated.

A battery charger 20 includes a control portion 21, an authentication IC 22, a non-volatile memory 23, and a charging circuit 25. The battery charger 20 converts electric power supplied from a commercial power source 30 into electric power for use in the charging of a battery, and supplies the converted electric power to a battery mounted in a battery mounting portion (not shown). The battery charger 20 can supply electric power to a battery (charging battery) that is attachable to and detachable from a portable device such as a video camera, a digital camera, and a mobile phone terminal, thereby charging the battery. The battery charger 20 may include the battery mounting portion (not shown) to/from which a battery alone can be attached/detached, or a device mounting portion (not shown) to/from which an electronic device with a battery can be attached/detached. In the case of including the device mounting portion (not shown), the battery charger 20 charges a battery that is built in an electronic device mounted in the device mounting portion. The battery charger 20 in Embodiment 2 includes the battery mounting portion (not shown) to/from which a battery alone can be attached/detached. In FIG. 6, a power supply line from the charging circuit 25 to the battery is not shown.

The authentication IC 22 executes authentication processing between the battery charger and the battery mounted in the battery mounting portion (not shown). Specifically, the authentication IC 22 requires the battery to provide its authentication information, compares the authentication information sent from the battery with authentication information stored in the authentication IC 22, and outputs a comparison result (authentication result) to the control portion 21. Although in Embodiment 2, the authentication IC 22 is realized by an IC (integrated circuit), the present invention is not limited thereto, as long as it can store at least the authentication information.

The charging circuit 25 converts electric power supplied from the commercial power source 30 into electric power for use in the charging of the battery. The charging circuit 25 supplies the electric power to a battery authenticated successfully in the battery charger 20.

The control portion 21 controls the operation of the charging circuit 25 based on the authentication result sent from the authentication IC 22. Specifically, when the battery is authenticated successfully in the authentication IC 22, the control portion 21 permits the charging operation of the charging circuit 25. On the other hand, when the authentication between the electronic device and the battery in the authentication IC 22 has failed, the control portion 21 does not permit the charging operation of the charging circuit 25. In Embodiment 2, the control portion 21 is realized by a microcomputer, for example.

The non-volatile memory 23 stores authentication information 24 including a plurality of ID marks. The authentication information 24 includes the ID marks of batteries that can be charged by the battery charger 20. The non-volatile memory 23 preferably is realized by an EEPROM (electrically erasable programmable read-only memory), a flash memory, or the like.

The battery charger 20 in Embodiment 2 is manufactured by a device manufacture or a non-genuine battery charger manufacturer. The device manufacturer can manufacture a device capable of using a battery that can be charged by the battery charger 20. The non-genuine battery charger manufacturer is different from the device manufacturer and authorized by the device manufacturer to manufacture the battery charger. The battery charger 20 manufactured by the non-genuine battery charger manufacturer is labeled with the same brand name as that specified by the device manufacturer or an original brand name of the non-genuine battery charger manufacturer. The device manufacturer verifies an operation of the non-genuine battery charger, and supplies the non-genuine battery charger manufacturer with the authentication IC when the operation of the non-genuine battery charger satisfies a predetermined condition. At this time, the device manufacturer writes authentication information (such as the ID mark) giving permission for use in the electronic device in the authentication IC, and then supplies the authentication IC to the non-genuine battery charger manufacturer. The non-genuine battery charger manufacturer incorporates the obtained authentication IC into the non-genuine battery charger. On the other hand, when the operation of the non-genuine battery charger does not satisfy the predetermined condition, the device manufacturer does not supply the non-genuine battery charger manufacturer with the authentication IC. Here, the "predetermined condition" refers to characteristics of charging the battery, characteristics of determining the type of the battery, and the like.

The genuine battery 1 is manufactured by the device manufacturer or a genuine battery manufacturer authorized by the device manufacturer to manufacture the battery. The genuine battery 1 manufactured by the genuine battery manufacturer is labeled with a brand name specified by the device manufacturer. The non-genuine battery 2 is manufactured by a non-genuine battery manufacturer authorized by the device manufacturer to manufacture the battery. The non-genuine battery 2 is labeled with an original brand name of the non-genuine battery manufacturer.

The device manufacturer verifies an operation of the non-genuine battery 2, and supplies the non-genuine battery manufacturer with an authentication IC 9 when the operation of the non-genuine battery 2 satisfies a predetermined condition. At this time, the device manufacturer writes authentication information (such as an ID mark) giving permission for use in the electronic device in the authentication IC 9, and then supplies the authentication IC 9 to the non-genuine battery manufacturer. The non-genuine battery manufacturer incorporates the obtained authentication IC 9 into the non-genuine battery 2. The device manufacturer informs the battery charger manufacturer that the authentication IC 9 has been supplied to the non-genuine battery manufacturer. The battery charger manufacturer writes the ID mark and related information of the non-genuine battery 2 in the non-volatile memory in its own battery charger. On the other hand, when the operation of the non-genuine battery 2 does not satisfy the predetermined condition, the device manufacturer does not supply the non-genuine battery manufacturer with the authentication IC. Here, the "predetermined condition" refers to a rated value of the battery, charging/discharging characteristics, and the like.

[2. Battery Authentication Processing]

Figure 7:
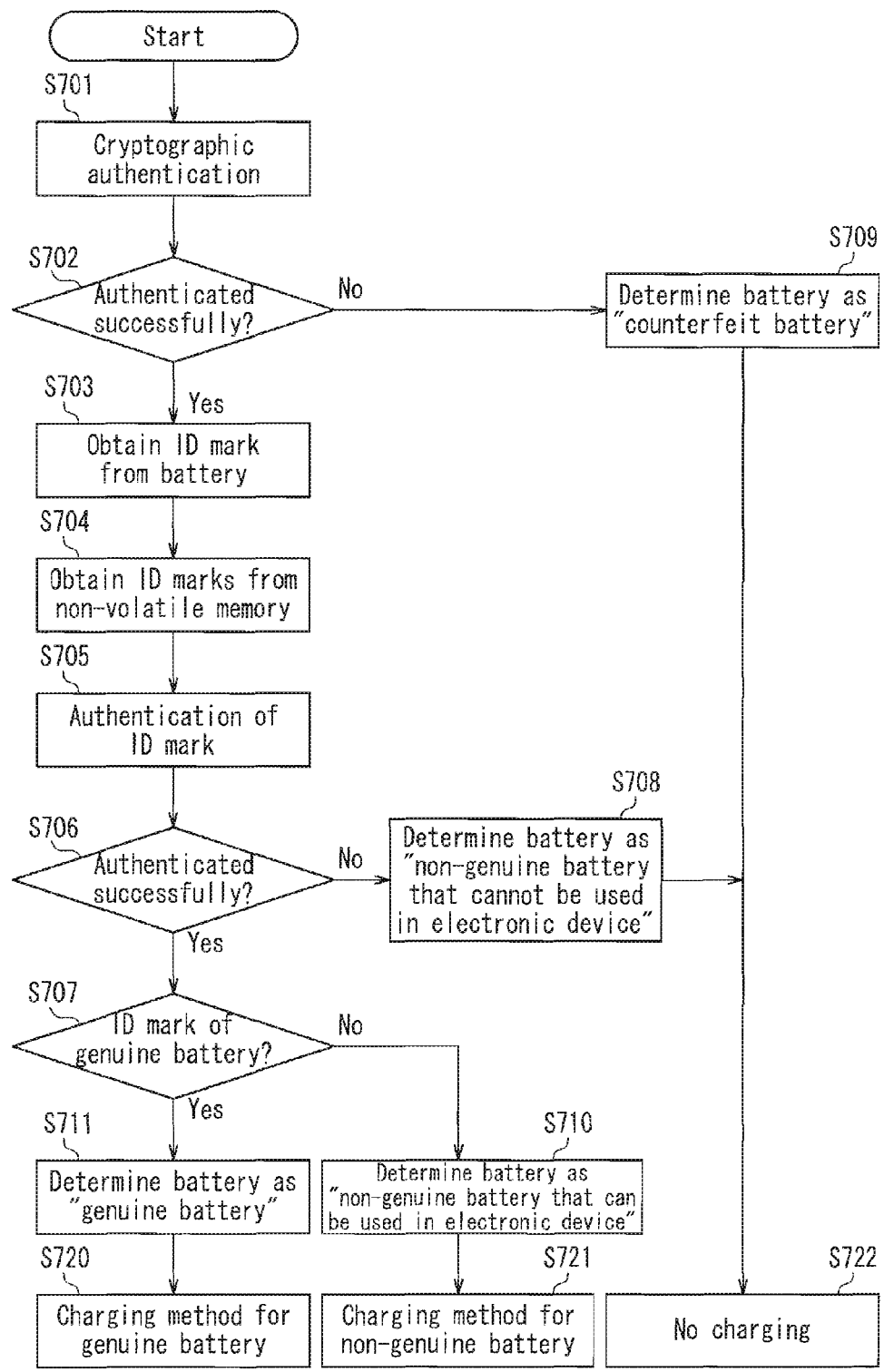
FIG. 7 is a flowchart illustrating battery determination processing according to Embodiment 2.

FIG. 7 is a flowchart illustrating authentication processing in the battery authentication system according to Embodiment 2.

Initially, when a battery is mounted in the predetermined battery mounting portion (not shown) in the battery charger 20, authentication processing is started. Specifically, the authentication IC 22 requires the battery to provide its cryptographic information. The authentication IC 22 analyzes the cryptographic information sent from the battery, and compares it with cryptographic information stored in the authentication IC 22. The authentication IC 22 sends a result of the comparison to the control portion 21 (S701).

When the battery is not authenticated as a result of the cryptographic authentication in the authentication IC 22 (No in S702), the control portion 21 determines that the battery mounted in the battery mounting portion is the counterfeit battery 3. More specifically, since the counterfeit battery 3 includes no authentication IC, the authentication IC 22 cannot obtain authentication information from the counterfeit battery 3, resulting in a failure of the cryptographic authentication (S709).

When determining that the battery mounted in the battery mounting portion is the counterfeit battery 3, the control portion 21 instructs the charging circuit 25 not to charge the battery. The charging circuit 25 does not charge the battery based on the control of the control portion 21 (S722).

On the other hand, when the battery is authenticated successfully as a result of the cryptographic authentication in the authentication IC 22 (Yes in S702), the control portion 21 reads out the ID mark stored in the authentication IC in the battery (S703).

Then, the control portion 21 reads out the ID marks stored in the non-volatile memory 23 (S704).

Thereafter, the control portion 21 compares the ID mark obtained from the authentication IC in the battery with the ID marks obtained from the non-volatile memory 23, thereby performing authentication (S705).

When the ID mark obtained from the authentication IC in the battery coincides with one of the ID marks obtained from the non-volatile memory 23 (Yes in S706), the control portion 21 determines that the "battery mounted in the battery mounting portion can be used in the battery charger". On the other hand, when the ID mark obtained from the authentication IC in the battery does not coincide with any of the ID marks obtained from the non-volatile memory 23 (No in S706), the control portion 21 determines that the "battery mounted in the battery mounting portion is a non-genuine battery that cannot be used in the battery charger" (S708).

The non-volatile memory 23 may store only the ID marks of batteries authorized to be used in the battery charger 20, or also may store ID marks of batteries that are not authorized to be used in the battery charger 20 in addition to the ID marks of batteries authorized to be used. In the case where the non-volatile memory 23 stores the ID marks of batteries authorized to be used in the battery charger 20 and the ID marks of batteries that are not authorized to be used, when the authentication ID of the battery coincides with one of the ID marks of batteries authorized to be used in the battery charger 20 in the authentication processing, the battery is authenticated successfully (Yes in S706). On the other hand, when the authentication ID of the battery coincides with one of the ID marks of batteries that are not authorized to be used in the battery charger 20, the battery is not authenticated (No in S706).

Then, the control portion 21 compares the ID mark obtained from the authentication IC in the battery with the ID marks obtained from the non-volatile memory 23, and determines whether the ID mark obtained from the authentication IC in the battery is the ID mark of the genuine battery or the ID mark of the non-genuine battery (S707). In a list of the ID marks stored in the non-volatile memory 23, the ID marks of the genuine batteries and the ID marks of the non-genuine batteries are specified.

When determining that the ID mark obtained from the authentication IC in the battery coincides with one of the ID marks of the genuine batteries stored in the non-volatile memory 23 (Yes in S707), the control portion 21 determines that the "battery mounted in the battery mounting portion is the genuine battery" (S711).

When determining that the battery mounted in the battery mounting portion is the genuine battery 1, the control portion 21 performs charge control suitable for the genuine battery (S720).

Figure 8A:
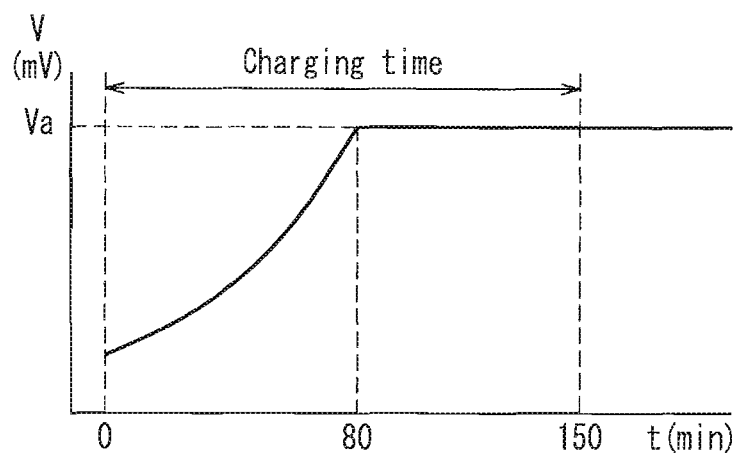
FIG. 8A is a characteristics diagram showing a change in a terminal voltage of a genuine battery during the charging of the genuine battery.
Figure 8B:
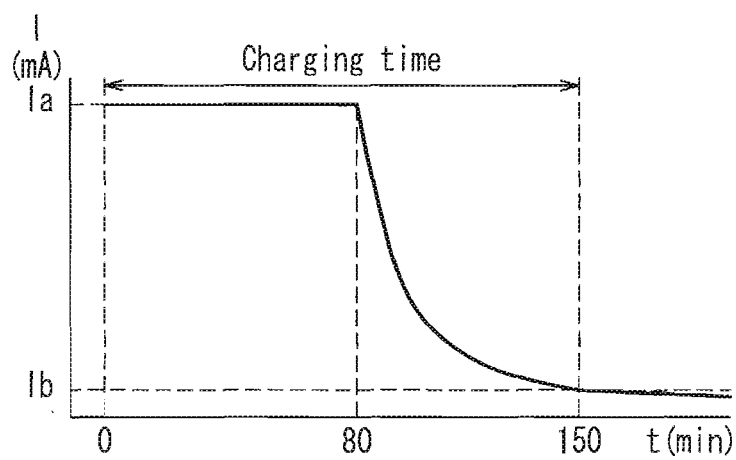
FIG. 8B is a characteristics diagram showing a change in an input current to a genuine battery during the charging of the genuine battery.

FIG. 8A shows a change in a voltage during the charging of the genuine battery 1. FIG. 8B shows a change in a current during the charging of the genuine battery 1. Information on an allowable current of a cell is written in the authentication IC 4 or a battery microcomputer (not shown) built in the genuine battery 1. When charging the genuine battery 1, the control portion 21 initially obtains the allowable current information from the authentication IC 4 or the battery microcomputer. Then, the control portion 21 instructs the charging circuit 25 to start charging the genuine battery 1. Based on the instruction from the control portion 21, the charging circuit 25 starts charging the genuine battery 1 with a maximum current Ia suitable for the characteristics and configuration of the cell. While charging the genuine battery 1 with the maximum current Ia, the charging circuit 25 monitors a terminal voltage V of the genuine battery 1. When the terminal voltage V of the genuine battery 1 reaches a predetermined voltage value Va (at about 80 minutes after the start of charging according to the characteristics shown in FIGS. 8A and 8B), an input current I to the genuine battery 1 starts decreasing. When the input current I to the genuine battery 1 decreases to a predetermined current value Ib (at about 150 minutes after the start of charging according to the characteristics shown in FIGS. 8A and 8B), the charging circuit 25 determines that the charging of the genuine battery 1 has been completed. In this manner, it is possible to charge the genuine battery 1 by inputting the maximum allowable current to the genuine battery 1, resulting in a shorter charging time.

Returning to FIG. 7, when determining that the ID mark obtained from the authentication IC in the battery coincides with one of the ID marks of the non-genuine batteries stored in the non-volatile memory 23 (No in S707), the control portion 21 determines that the "battery mounted in the battery mounting portion is the non-genuine battery that can be used in the battery charger" (S710).

When determining that the battery mounted in the battery mounting portion is the non-genuine battery 2 that can be used in the battery charger 20, the control portion 21 performs charge control suitable for the non-genuine battery. By the charge control for the non-genuine battery, the control portion 21 can determine full charging of the battery while observing a terminal voltage and a charging current of the battery, for example (S721).

Figure 9A:
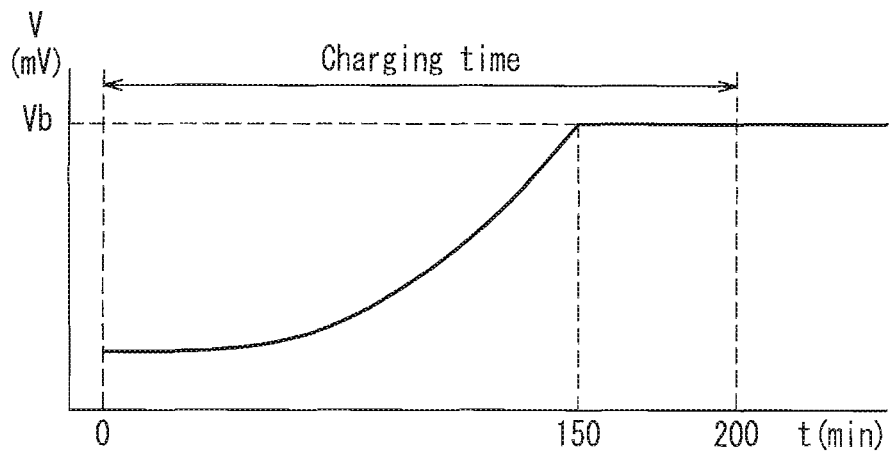
FIG. 9A is a characteristics diagram showing a change in a terminal voltage of a genuine battery during the charging of a non-genuine battery.
Figure 9B:
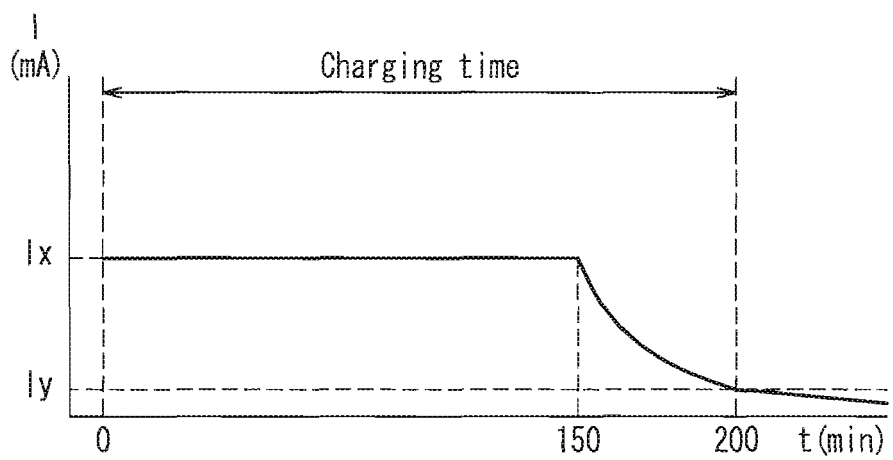
FIG. 9B is a characteristics diagram showing a change in an input current to a genuine battery during the charging of a non-genuine battery.
Figure 10:
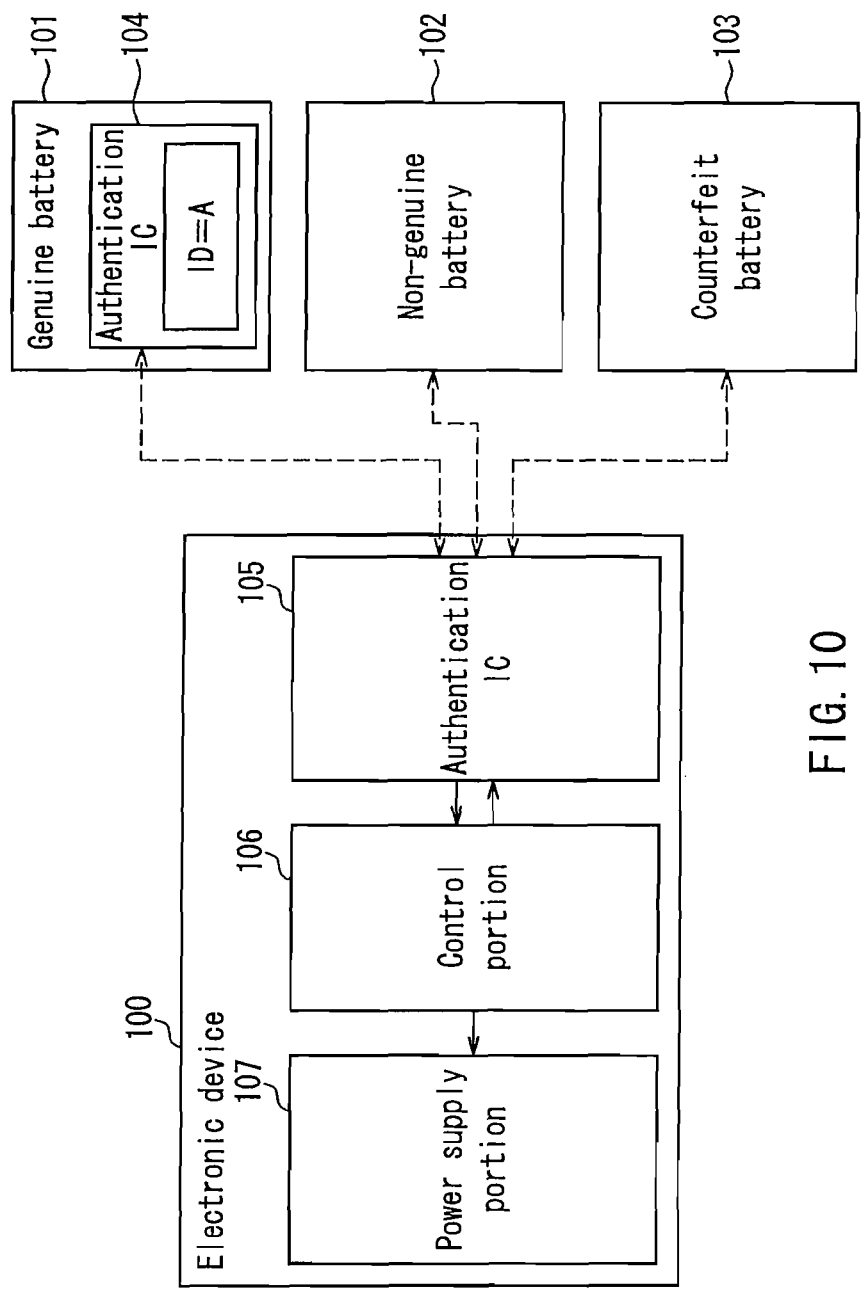
FIG. 10 is a block diagram showing a conventional battery authentication system.

FIG. 9A shows a change in a voltage during the charging of the non-genuine battery 2. FIG. 9B shows a change in a current during the charging of the non-genuine battery 2. The non-genuine battery 2 does not include a battery microcomputer or the like storing information on a cell. Thus, the battery charger 20 charges the non-genuine battery 2 by supplying a minimum current thereto so as to prevent a heavy load on the non-genuine battery 2. Specifically, as shown in FIG. 9B, the charging is started by inputting a minimum current Ix to the non-genuine battery 2. While charging the non-genuine battery 2 with the minimum current Ix, the charging circuit 25 monitors a terminal voltage V of the non-genuine battery 2. When the terminal voltage V of the non-genuine battery 2 reaches a predetermined voltage value Vb (at about 150 minutes after the start of charging according to the characteristics shown in FIGS. 9A and 9B), an input current I to the non-genuine battery 2 starts decreasing. When the input current I to the non-genuine battery 2 decreases to a predetermined current value Iy, the charging circuit 25 determines that the charging of the non-genuine battery 2 has been completed. According to the characteristics shown in FIGS. 9A and 9B, at about 200 minutes after the start of charging, the input current I to the non-genuine battery 2 decreases to the predetermined current value Iy, and accordingly the charging circuit 25 determines the completion of the charging of the non-genuine battery 2.

[3. Effect etc. of Embodiment 2]

According to the battery authentication system of Embodiment 2, the non-genuine battery 2 includes the authentication IC 9 storing the ID mark given specifically to the non-genuine battery that can be charged by the battery charger 20, and the battery charger 20 includes the non-volatile memory 23 storing the ID marks of batteries that can be charged by the battery charger 20. Therefore, it is possible to permit the charging of the genuine battery 1 and the non-genuine battery 2 and to regulate the charging of the counterfeit battery 3.

Further, it is determined whether the battery is the genuine battery 1 or the non-genuine battery 2, and the charging method is changed according to a result of the determination, so that the charge control can be performed suitably for the respective batteries. More specifically, in the case of charging the genuine battery 1, the control portion 21 obtains the information on the allowable current and the like from the genuine battery 1, so that the genuine battery 1 can be charged in a short time based on the information on the allowable current and the like. On the other hand, in the case of charging the non-genuine battery 2, the non-genuine battery 2 is charged with a low current so as to prevent a heavy load thereon.

Since the authentication IC 22 has the same authentication function as that of an authentication IC mounted on the electronic device, the same authentication IC as that for use in the electronic device can be used. Accordingly, there is no need to design and manufacture the authentication IC specifically for the battery charger 20, resulting in a reduction in costs.

In Embodiment 2, the ID information of batteries that can be charged also can be stored in a partial region in a program memory (more specifically, a non-volatile memory such as a flash memory and a mask ROM) built in the control portion 21. In such a case, it is possible to reduce costs, although the flexibility in rewriting the authentication information decreases as compared with the case of using the external non-volatile memory 23.

In the case of an electronic device that allows a battery to be charged in a built-in state in a main body, there is no need to provide two authentication ICs for charging and discharging, and one authentication IC can be used in common, resulting in a reduction in costs.

The battery authentication system according to the present invention is useful in portable devices such as a digital video camera, a mobile phone terminal, a digital still camera, and a laptop personal computer.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A battery authentication system comprising: an electronic device; and a battery that is attachable to and detachable from the electronic device, wherein the battery comprises a battery authentication portion that includes battery identification information and performs authentication between the battery and the electronic device, wherein the electronic device comprises: a power source that supplies electric power from the battery to respective portions in the electronic device; a storage portion that stores the battery identification information of usable batteries; a device authentication portion that performs authentication of the battery; and a control portion, wherein the electronic device is configured to perform a two stage authentication process that includes a first stage authentication process to determine whether the battery is a counterfeit battery and a second stage authentication process to determine whether the battery is a non-genuine battery, and wherein during the second stage authentication process, the control portion compares the battery identification information of the battery authenticated successfully in the device authentication portion during the first stage authentication process with the battery identification information stored in the storage portion, and controls the power source based on a result of the comparison.

2. A battery authentication system comprising: a battery charger; and a battery that is attachable to and detachable from the battery charger, wherein the battery comprises a battery authentication portion that includes battery identification information and performs authentication between the battery and the battery charger, wherein the battery charger comprises: a storage portion that stores the battery identification information of usable batteries; a battery charger authentication portion that performs authentication of the battery; and a control portion, wherein the battery charger is configured to perform a two stage authentication process that includes a first stage authentication process to determine whether the battery is a counterfeit battery and a second stage authentication process to determine whether the battery is a non-genuine battery, and wherein during the second stage authentication process, the control portion compares the battery identification information of the battery authenticated successfully in the battery charger authentication portion during the first stage authentication process with the battery identification information stored in the storage portion, and controls a charging operation based on a result of the comparison.

3. The battery authentication system according to claim 1, further comprising a display portion that can display remaining amount information of the battery, wherein the control portion changes a display mode of the remaining amount information to be displayed in the display portion according to the battery identification information.

4. The battery authentication system according to claim 1, wherein the battery identification information stored in the storage portion is modifiable.

5. The battery authentication system according to claim 1, wherein the battery identification information stored in the battery authentication portion only can be read out from the battery authentication portion.

6. An electronic device that can be operated by electric power supplied by a battery including battery identification information, the device comprising:

a power source that supplies the electric power from the battery to respective portions in the electronic device;

a storage portion that stores the battery identification information of usable batteries;

a device authentication portion that is configured to perform a first stage authentication process of a two stage authentication process to determine whether the battery is a counterfeit battery; and a control portion, wherein the control portion is configured to perform a second stage authentication process by comparing the battery identification information of the battery authenticated successfully in the device authentication portion during the first stage authentication process with the battery identification information stored in the storage portion to determine whether the battery is a non-genuine battery, and the control portion is configured to control the power source based on a result of the comparison.

7. A battery charger that can charge a battery including battery identification information, the charger comprising:

a storage portion that stores the battery identification information of usable batteries;

a battery charger authentication portion that is configured to perform a first stage authentication process of a two stage authentication process to determine whether the battery is a counterfeit battery; and a control portion, wherein the control portion is configured to perform a second stage authentication process by comparing the battery identification information of the battery authenticated successfully during the first stage authentication process in the battery charger authentication portion with the battery identification information stored in the storage portion to determine whether the battery is a non-genuine battery, and the control portion is configured to control a charging operation based on a result of the comparison.

8. A battery comprising a battery authentication portion that includes battery identification information and is configured to perform a first stage authentication of a two stage authentication process between the battery and an electronic device or a battery charger to determine whether the battery is a counterfeit battery, wherein the battery authentication portion stores the battery identification information that is different depending on a type of the battery, and wherein when the battery is authenticated successfully during the first stage authentication of the two stage authentication process, the battery identification information is compared with battery identification stored in the electronic device or the battery charger to determine whether the battery is a non-genuine battery at a second stage of the two stage authentication process.

* * * * *